(12) United States Patent
Lee et al.

(10) Patent No.: US 10,625,575 B2
(45) Date of Patent: Apr. 21, 2020

(54) SLIM-TYPE AIR VENT DEVICE FOR VEHICLE

(71) Applicants: Hyundai Motor Company, Seoul (KR); Kia Motors Corporation, Seoul (KR); NIFCO KOREA Inc., Asan-si (KR); Hyundai Mobis Co., Ltd., Seoul (KR)

(72) Inventors: Young Ju Lee, Suwon-si (KR); In Seop Kim, Uiwang-si (KR); Young Rok Lee, Hwaseong-si (KR); Young Beom Lee, Bucheon-si (KR); Choong Yeul Kim, Suwon-si (KR); Dae Ig Jung, Suwon-si (KR); Keun Sig Lim, Yongin-si (KR); Ji Won Lee, Cheonan-si (KR); Jae Seob Choi, Yongin-si (KR); Won Sik Kim, Yongin-si (KR)

(73) Assignees: Hyundai Motor Company, Seoul (KR); Kia Motors Corporation, Seoul (KR); NIFCO KOREA Inc., Asan-si (KR); Hyundai Mobis Co., Ltd., Seoul (KR)

( * ) Notice: Subject to any disclaimer, the term of this patent is extended or adjusted under 35 U.S.C. 154(b) by 125 days.

(21) Appl. No.: 15/719,268

(22) Filed: Sep. 28, 2017

(65) Prior Publication Data

US 2018/0170153 A1    Jun. 21, 2018

(30) Foreign Application Priority Data

Dec. 21, 2016   (KR) .................. 10-2016-0175488

(51) Int. Cl.
*B60H 1/34*            (2006.01)

(52) U.S. Cl.
CPC ... *B60H 1/3421* (2013.01); *B60H 2001/3471* (2013.01); *B60H 2001/3478* (2013.01)

(58) Field of Classification Search
CPC ................ B60H 1/248–249; B60H 2001/3471
USPC .................................. 454/152–155
See application file for complete search history.

(56) References Cited

U.S. PATENT DOCUMENTS

| 6,780,098 B2 * | 8/2004 | Nishida ................ B60H 1/3414 454/155 |
| 10,131,210 B2 * | 11/2018 | Belzons ............... B60H 1/3421 |
| 2010/0216386 A1 * | 8/2010 | Bruss ................. B60H 1/00857 454/136 |

* cited by examiner

*Primary Examiner* — Vivek K Shirsat
(74) *Attorney, Agent, or Firm* — Morgan, Lewis & Bockius LLP (57) ABSTRACT

A slim-type air vent device for a vehicle may include: a single horizontal wing mounted at an outlet position of a slim air duct to be vertically rotatable, the single horizontal wing being exposed to the outside; an integrated control knob mounted to the single horizontal wing to be horizontally movable; dampers mounted in a rear space in the slim air duct such that an opening angle of each of the dampers is adjustable; a gear assembly disposed between a back surface of the integrated control knob and rotation shafts of the dampers, the gear assembly having a plurality of gears; and a plurality of vertical wings mounted immediately behind the single horizontal wing in an internal space of the slim air duct, to be rotated in a left or right direction by a single link during a left or right movement of the integrated control knob.

11 Claims, 13 Drawing Sheets

FIG. 1

(PRIOR ART)

FIG. 2

(PRIOR ART)

SLIM-TYPE AIR VENT DEVICE FOR VEHICLE

CROSS-REFERENCE TO RELATED APPLICATIONS

The present application claims priority to Korean Patent Application No. 10-2016-0175488 filed on Dec. 21, 2016, the entire contents of which are incorporated herein for all purposes by this reference.

BACKGROUND OF THE INVENTION

Field of the Invention

The present invention relates to an air vent device for a vehicle. More particularly, it relates to a slim-type air vent device for a vehicle, capable of allowing a wind direction of a vertical wing and opening and closing of a damper to be adjusted together by operation of an integrated control knob included in the slim-type air vent device.

Description of Related Art

With the enlargement of a cluster and an AVN (Audio, Video, Navigation) system mounted in a vehicle interior, the disposed position of an air vent, from which air is discharged depending on the operation of an air conditioner and a heater, tends to move to the lower region of a center fascia panel, and particularly the air vent tends to be designed to have a slim external appearance.

In general, the air vent includes a center air vent which is mounted to the center fascia panel in the front between a driver seat and a passenger seat, a side vent which is mounted to a crash pad in the front of the driver seat and the passenger seat, etc.

Figure 1:
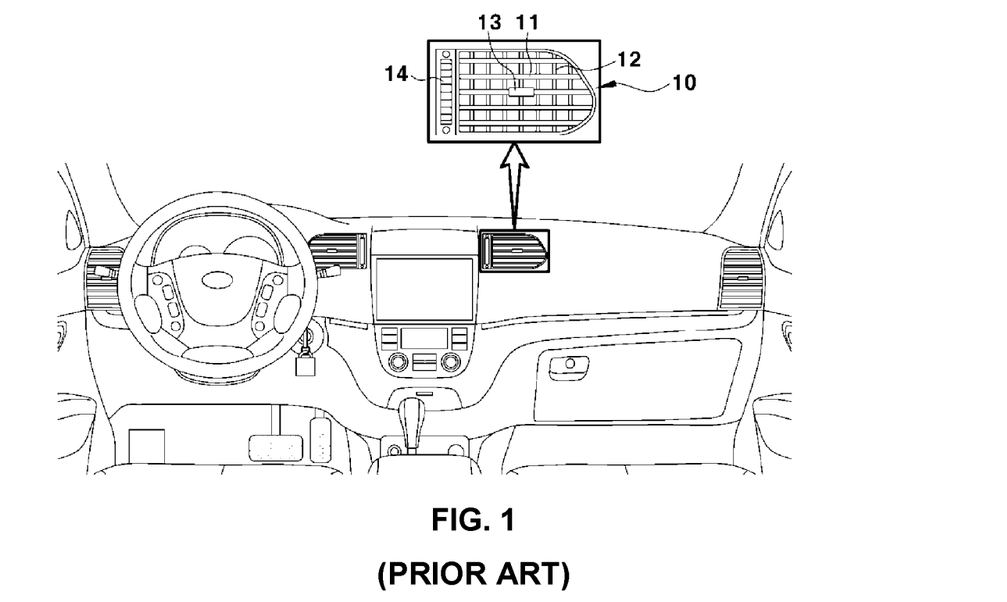
FIG. 1 is a view schematically illustrating arrangement of an existing air vent.
Figure 2:
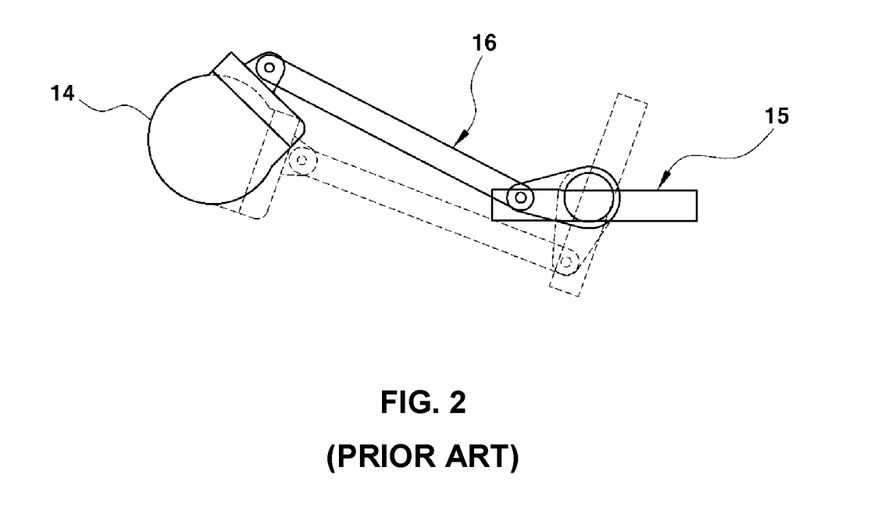
FIG. 2 is a view schematically illustrating a structure in which an opening angle of a damper from among the components of the existing air vent is adjusted.

FIG. 1 is a view illustrating the external appearance of a center air vent among existing air vents, and FIG. 2 is a view schematically illustrating a connection structure between an air volume control knob and a damper.

As illustrated in FIG. 1, a plurality of horizontal wings 11 and vertical wings 12 are rotatably mounted to the outlet of an air duct 10, and an air volume control knob 13 for adjusting the vertical angles of the horizontal wings 11 and the horizontal angles of the vertical wings 12 is mounted to one of the horizontal wings 11.

In addition, a damper control knob 14 is turnably mounted next to the outlet of the air duct 10.

As illustrated in FIG. 2, a damper 15 is mounted to the rear in the air duct 10 to be openable and closable, and is connected to the damper control knob 14 through a predetermined link structure 16.

Accordingly, when the damper control knob 14 is turned, the damper 15 is rotated in a closed or opened direction by the predetermined link structure 16 interlocked therewith, thereby adjusting the volume of air discharged to the interior through the air duct. When the damper 15 is closed, the flow of air to the interior is blocked.

However, since the existing air vent has a structure in which the horizontal and vertical wings are exposed in appearance, it occupies a lot of installation space in a center fascia panel or a crash pad, which may lead to a low degree of freedom in the design of a cluster and an AVN system arranged around the air vent.

Therefore, a slim-type air vent having a single horizontal wing is applied to improve the degree of freedom in the design of the cluster and the AVN system.

Moreover, to further improve the degree of freedom in the design of the cluster and the AVN system, a study of a slim-type air vent directly integrated with a damper control knob without an existing damper control knob is being carried out.

The information disclosed in this Background of the Invention section is only for enhancement of understanding of the background of the invention and should not be taken as an acknowledgement or any form of suggestion that this information forms the conventional art already known to a person skilled in the art.

BRIEF SUMMARY

Various aspects of the present invention are directed to providing a slim-type air vent device for a vehicle, which is characterized in that an integrated control knob is directly mounted to a single horizontal wing applied to the slim-type air vent device to adjust wind directions of vertical wings in left and right directions and an opening angle of a damper, and a gear assembly having a plurality of gears is mounted between the integrated control knob and the damper disposed in the rear compartment in an air duct, so that the opening angle of the damper can be easily adjusted by the maximum movement of the integrated control knob in one direction and at the same time the interlocking of the gear assembly.

Various aspects of the present invention are directed to providing a slim-type air vent device for a vehicle, configured for allowing air discharged inside a vehicle to be regulated in left and right directions, wherein when an integrated control knob mounted to a single horizontal wing is configured to be operated in a left or right direction, a plurality of vertical wings disposed behind the single horizontal wing are rotated together in the left or right direction.

In an exemplary embodiment, a slim-type air vent device for a vehicle includes a single horizontal wing mounted at an outlet position of a slim air duct to be vertically rotatable, the single horizontal wing being exposed to an outside thereof, an integrated control knob mounted to the single horizontal wing to be horizontally movable, dampers mounted in a rear space in the slim air duct wherein an opening angle of each of the dampers is adjustable, a gear assembly disposed between a back surface of the integrated control knob and rotation shafts of the dampers, for transmission of power, the gear assembly having a plurality of gears, and a plurality of vertical wings mounted immediately behind the single horizontal wing in an internal compartment of the slim air duct, to be simultaneously rotated in a left or right direction by a single link during the left or right movement of the integrated control knob.

The integrated control knob may have a slide hole which horizontally passes therethrough for insertion of the single horizontal wing.

The gear assembly may include a plurality of input gears mounted to the integrated control knob and one of the vertical wings, output gears mounted to the rotation shafts of the dampers, and a plurality of carrier gears disposed between the input gears and the output gears to transmit rotation force from the input gears to the output gears.

The input gears may include a wing knob rack gear mounted to the back surface of the integrated control knob, a front wing gear formed on a front end portion of a centermost vertical wing of the vertical wings to engage with the wing knob rack gear, and a main gear disposed at the bottom of a lower plate of the slim air duct and coaxially fastened to a lower hinge pin of the centermost vertical wing.

The main gear may have a locking pin formed at one side thereof, the locking pin passing through the lower plate of the slim air duct, and the centermost vertical wing may have a locking groove formed in a bottom rear end portion thereof, the locking pin being inserted and fastened into the locking groove.

The lower plate of the slim air duct may be formed with a slot for restricting an angle of left-right rotation of the main gear, and the locking pin may be inserted through the slot to be horizontally movable.

The carrier gears may include a first transmission gear rotatably mounted to the bottom of the slim air duct to be engageable with a main gear of the input gears, a second transmission gear engaged with the first transmission gear and a third transmission gear having a greater diameter than the second transmission gear. The second transmission gear and the third transmission gear are vertically stacked to be integrated to each other and are rotatably mounted to the bottom of the slim air duct.

The output gears may engage with a third transmission gear of the carrier gears while being coaxially connected to the rotation shafts of the dampers mounted in the rear compartment in the slim air duct.

The slim air duct may have a partition wall formed in the rear compartment thereof to divide the rear compartment into left and right compartments, considering that the slim air duct has a greater horizontal length than a vertical height thereof, and the dampers may be openably or closably mounted in the respective rear compartments divided by the partition wall.

Meanwhile, upper and lower support plates for rotatably supporting the vertical wings may be mounted to upper and lower plates in the internal compartment of the slim air duct, and each of the vertical wings may have upper and lower hinge pins formed on upper and lower surfaces thereof, the upper and lower hinge pins being respectively fastened to the upper and lower support plates by hinges.

The lower support plate may have a slot passing therethrough, the slot having the same shape as a slot formed in the lower plate of the slim air duct.

Guide pins may be formed behind the upper hinge pins of the respective vertical wings to simultaneously rotate the vertical wings, and all of the guide pins may be connected to the single link, which is horizontally disposed, by hinges.

Various aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together server to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
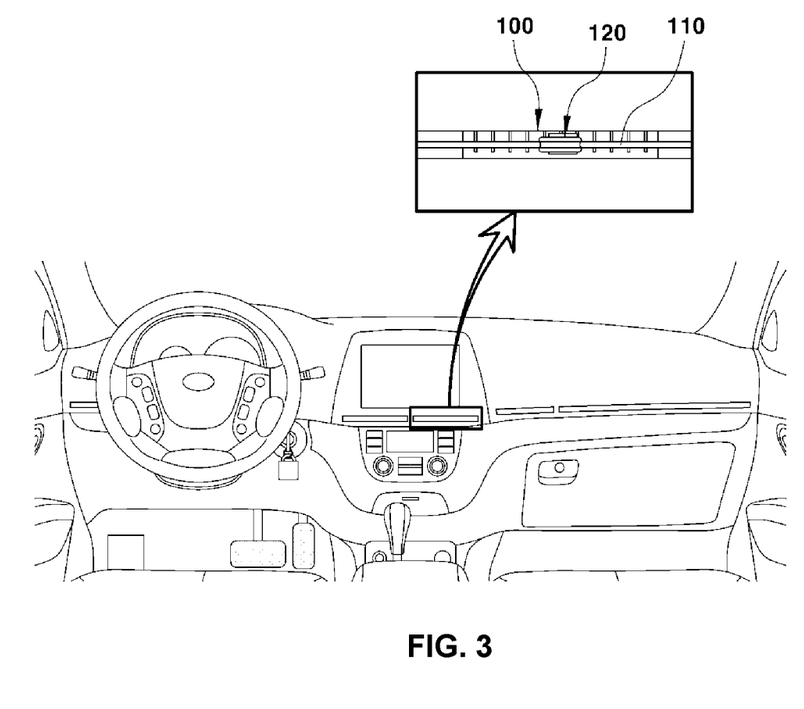
FIG. 3 is a view schematically illustrating the external appearance of a slim-type air vent device for a vehicle according to an exemplary embodiment of the present invention.

FIG. 3 is a view schematically illustrating the external appearance of a slim-type air vent device for a vehicle according to an exemplary embodiment of the present invention, and it can be seen that only a single horizontal wing 110 is exposed to the outside at the outlet position of a slim air duct 100.

The slim air duct 100 has a longer horizontal length and a lower vertical height, compared with those of an existing air vent. Therefore, it is possible to secure a wider space for installation of a cluster and an AVN system disposed in a center fascia panel or a crash pad, compared with an existing compartment, and to improve a degree of freedom in the design of the cluster and the AVN system.

In addition, since the slim air duct 100 has a longer horizontal length and a lower vertical height, compared with those of an existing air vent, it is impossible to intensively dispose a plurality of horizontal and vertical wings at the outlet position of the slim air duct 100. However, it is possible to express simple aesthetics in appearance since only the single horizontal wing 110 is mounted at the outlet position of the slim air duct 100 to be vertically rotatable.

Accordingly, the present invention is characterized in that an integrated control knob is directly mounted to a single horizontal wing of a slim-type air vent device to adjust the wind directions of vertical wings in left and right directions and the opening angle of a damper, and a gear assembly having a plurality of gears is mounted between the integrated control knob and the damper disposed in the rear compartment in an air duct, so that the wind directions of the vertical wings can be adjusted in the left and right directions within the limited range of the horizontal movement distance of the integrated control knob and the opening angle of the damper can be easily adjusted by the interlocking of the gear assembly when the integrated control knob is maximally moved in one direction.

FIG. 4 to FIG. 8 are views illustrating the configuration of the slim-type air vent device for a vehicle according to an exemplary embodiment of the present invention, and reference numeral 100 refers to a slim air duct.

The single horizontal wing 110 is fastened by a hinge at the outlet position of the slim air duct 100, preferably to the center fascia panel or the crash pad corresponding to the outlet position of the slim air duct 100, to be vertically rotatable, facilitating air discharged inside a vehicle to be adjusted in upward and downward directions thereof.

An integrated control knob 120 is mounted to the single horizontal wing 110 to be horizontally movable to adjust the wind directions of vertical wings 130 in the left and right directions and to adjust the opening angle of a damper 300.

To this end portion, the integrated control knob 120 has a slide hole 122 which horizontally passes therethrough, and the single horizontal wing 110 is inserted through the slide hole 122 so that the integrated control knob 120 is movable to the left or the right along the single horizontal wing 110.

Meanwhile, the damper 300 is rotatably mounted in the rear compartment of the slim air duct 100. The flow of air discharged inside a vehicle is blocked when the damper 300 is closed, whereas the flow of air is allowed when the damper 300 is opened. Thus, the volume of air discharged inside a vehicle may be adjusted depending on the opening angle of the damper.

In the present case, since the slim air duct 100 in which air flows has a greater horizontal length than the vertical height thereof and thus has a horizontally elongated cross-sectional area, there is a limit in blocking the flow of air with the opening or closing trajectory of one damper.

Accordingly, the slim air duct 100 has a partition wall 102 formed in the rear compartment thereof to divide the rear compartment into two compartments (a left compartment and a right compartment), and the damper 300 includes of two dampers which are openably or closably mounted in the respective rear compartments divided by the partition wall 102.

To adjust the opening angles of the dampers 300, a gear assembly 200 having a plurality of gears is disposed between the back surface of the integrated control knob 120 and rotation shafts 302 of the dampers 300, for transmission of power.

The gear assembly 200 includes a plurality of input gears 210 which are mounted to the integrated control knob 120 and a centermost vertical wing 130-1 of the vertical wings 130, output gears 230 which are directly connected to the rotation shafts 302 of the dampers 300, and a plurality of carrier gears 220 which are disposed between the input gears 210 and the output gears 230 to transmit rotation force from the input gears 210 to the output gears 230. The gear assembly 200 may include gears combined in various forms.

The input gears 210 as one component of the gear assembly 200 include a wing knob rack gear 211 which is mounted to the back surface of the integrated control knob 120, a front wing gear 212 which is formed on the front end portion of the centermost vertical wing 130-1 of the vertical wings 130 to engage with the wing knob rack gear 211, and a main gear 213 which is disposed at the bottom of a lower plate 104 of the slim air duct 100 and is coaxially fastened to a lower hinge pin 131 of the centermost vertical wing 130-1.

In the present case, the front wing gear 212 and the main gear 213 are interconnected to be rotatable at the same time. To this end portion, a locking pin 214, which passes through the lower plate 104 of the slim air duct 100, is formed at one side of the main gear 213, and a locking groove 132, into which the locking pin 214 is inserted and fastened, is formed in the bottom rear end portion of the centermost vertical wing 130-1.

Accordingly, when the integrated control knob 120 is moved to the left or the right, the front wing gear 212 mounted to the centermost vertical wing 130-1 is rotated while the wing knob rack gear 211 mounted to the integrated control knob 120 is moved to the left or the right, and then the main gear 213 coaxially fastened to the lower hinge pin 131 of the centermost vertical wing 130-1 is rotated in a direction opposite to that of the front wing gear 212.

Furthermore, since the locking pin 214 of the main gear 213 is fastened to the locking groove 132 of the centermost vertical wing 130-1, the main gear 213 may be operated along with the rotation of the front wing gear 212 mounted to the centermost vertical wing 130-1.

The reason why the locking pin 214 of the main gear 213 is fastened to the locking groove 132 of the centermost vertical wing 130-1 is substantially to restrict the left or right movement distance of the integrated control knob 120.

To this end portion, the lower plate 104 of the slim air duct 100 is formed with a slot 106 for restricting the angle of left-right rotation of the main gear 213, and the locking pin 214 is inserted through the slot 106 to be horizontally movable.

Thus, the angle of rotation of the main gear 213 is restricted to the distance by which the locking pin 214 is moved along the slot 106, and the angle of rotation of the front wing gear 212 which transmits rotation force to the main gear 213 is also restricted due to the restriction of the angle of rotation of the main gear 213. In addition, the horizontal movement distance of the wing knob rack gear 211 rotating the front wing gear 212 is restricted, and therefore the horizontal movement distance of the integrated control knob 120 formed with the wing knob rack gear 211 is restricted.

The carrier gears 220 as the other component of the gear assembly 200 include a first transmission gear 221, a second transmission gear 222 and a third transmission gear 223. The second transmission gear 222 and the third transmission gear 223 are stacked into one (dual-type gear).

In the present case, the first transmission gear 221 of the carrier gears 220 is rotatably mounted to the bottom of the slim air duct 100 to be engageable with the main gear 213 of the input gears 210, and the second transmission gear 222 engaged with the first transmission gear 221 and the third transmission gear 223 having a greater diameter than the second transmission gear 222 are vertically stacked to be integrated to each other and are rotatably mounted to the bottom of the slim air duct 100.

The carrier gears 220 are intensively mounted to the bottom of the slim air duct 100 since the slim air duct 100 has a small internal compartment that is horizontally elongated and to prevent interference with the flow of air.

The output gears 230 are coaxially connected to the rotation shafts 302 of the dampers 300 mounted in the rear compartment in the slim air duct 100 and are located at the bottom of the slim air duct 100, so that the output gears 230 engage with the third transmission gear 223 of the carrier gears 220.

Figure 4:
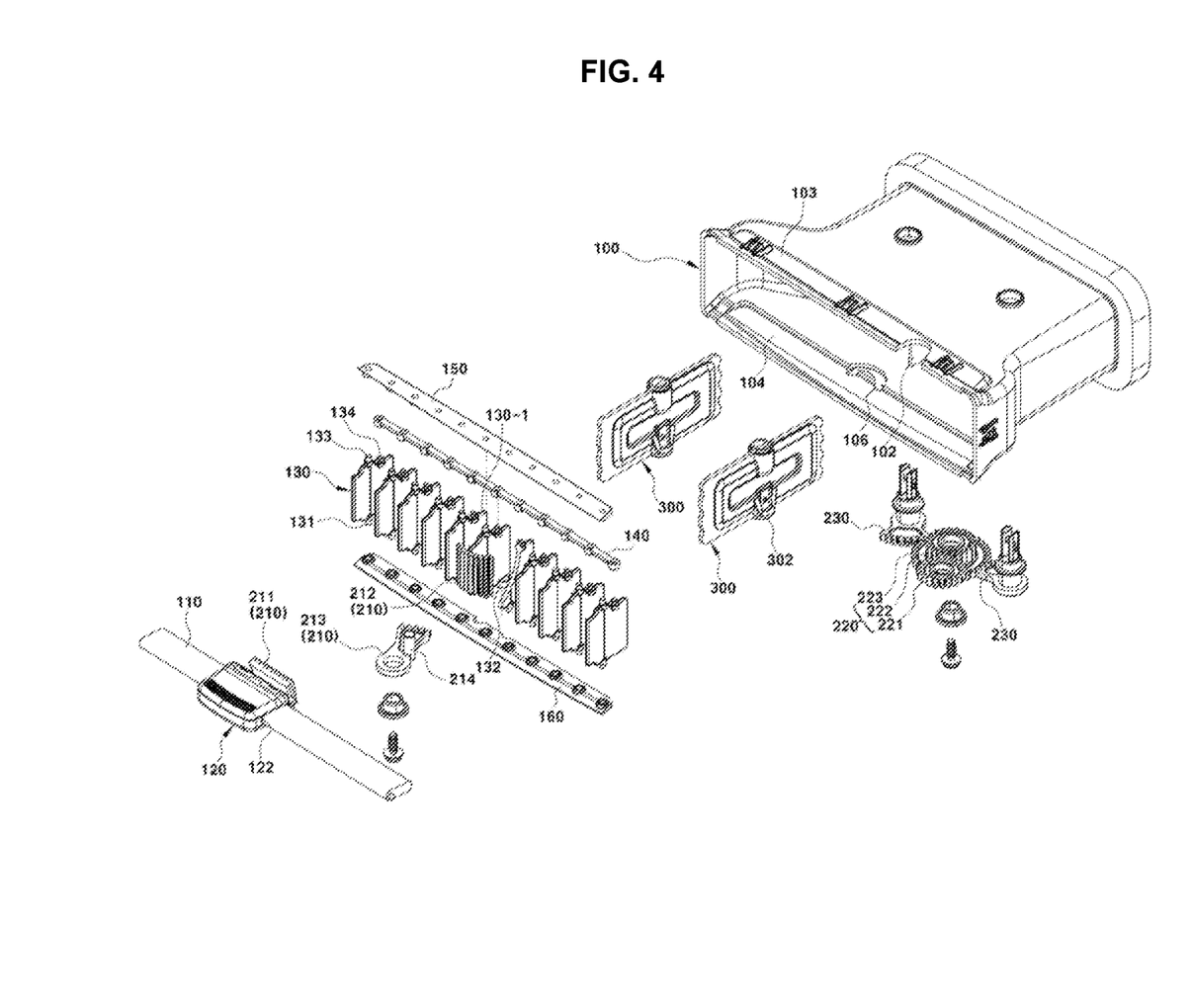
FIG. 4 is an exploded perspective view illustrating the slim-type air vent device for a vehicle according to an exemplary embodiment of the present invention.
Figure 5:
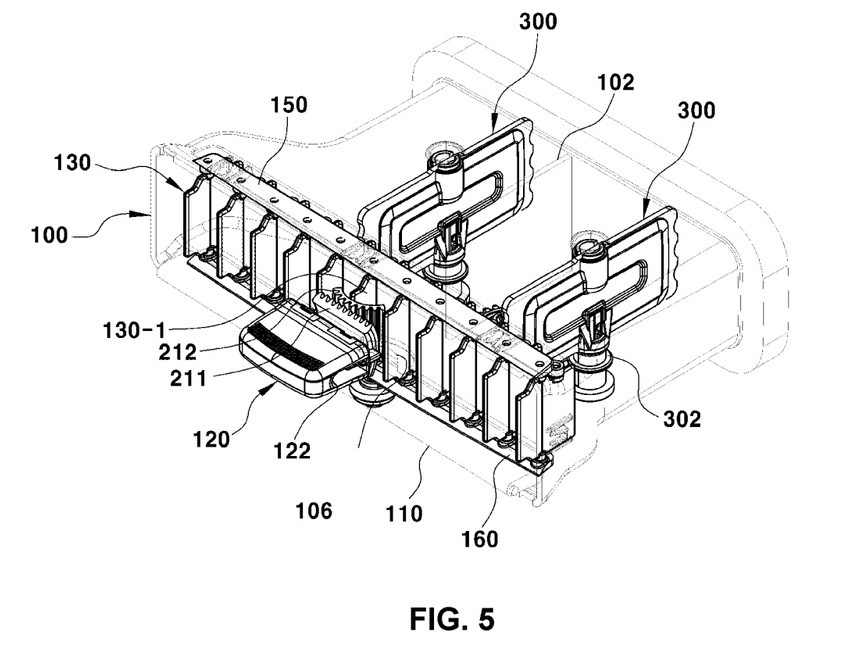
FIG. 5 and FIG. 6 are assembled perspective views illustrating the slim-type air vent device for a vehicle according to an exemplary embodiment of the present invention.
Figure 6:
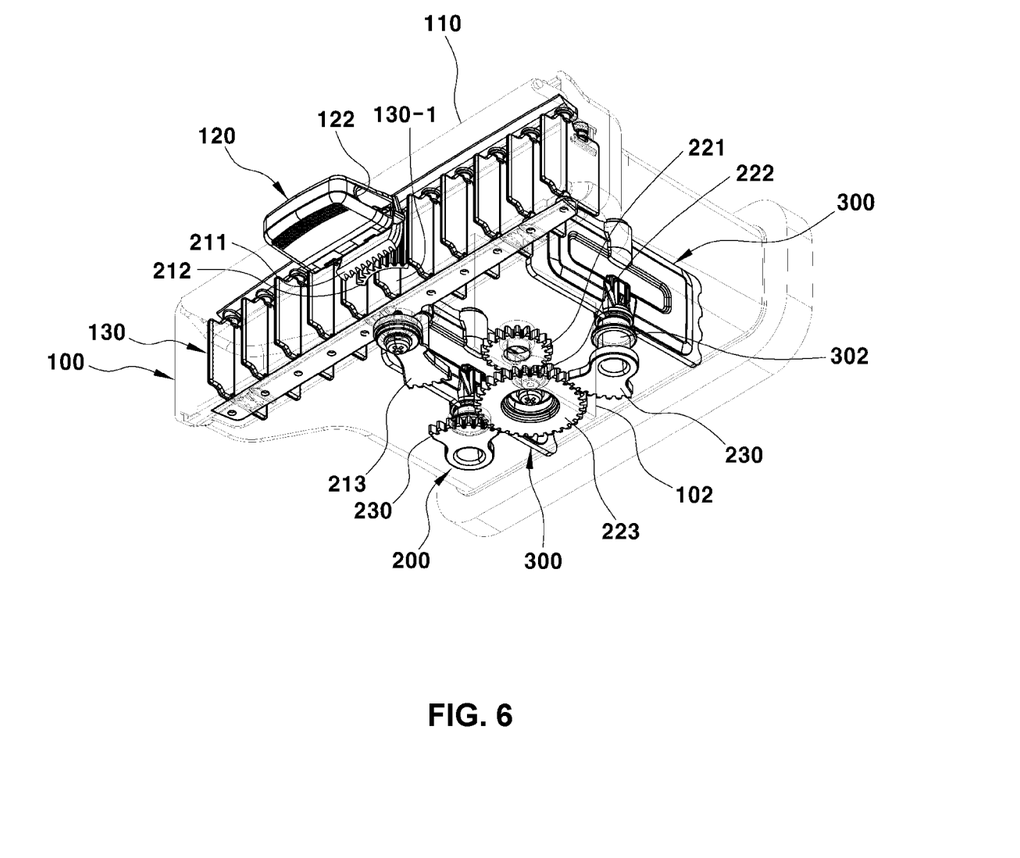
Figure 7:
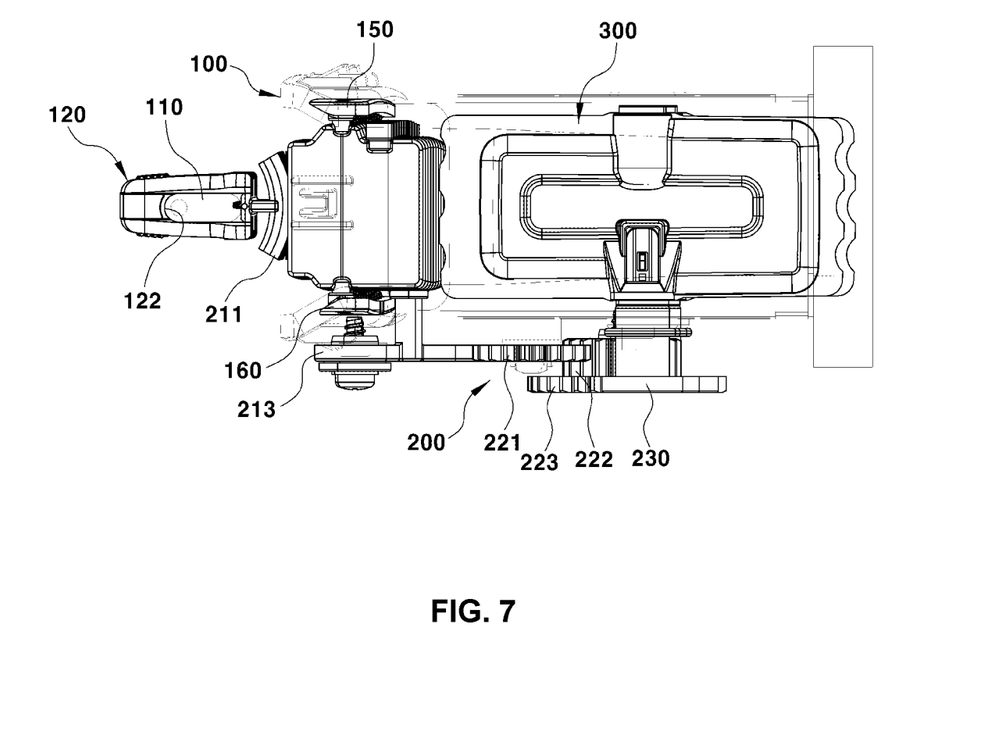
FIG. 7 is a side view illustrating the slim-type air vent device for a vehicle according to an exemplary embodiment of the present invention.
Figure 8:
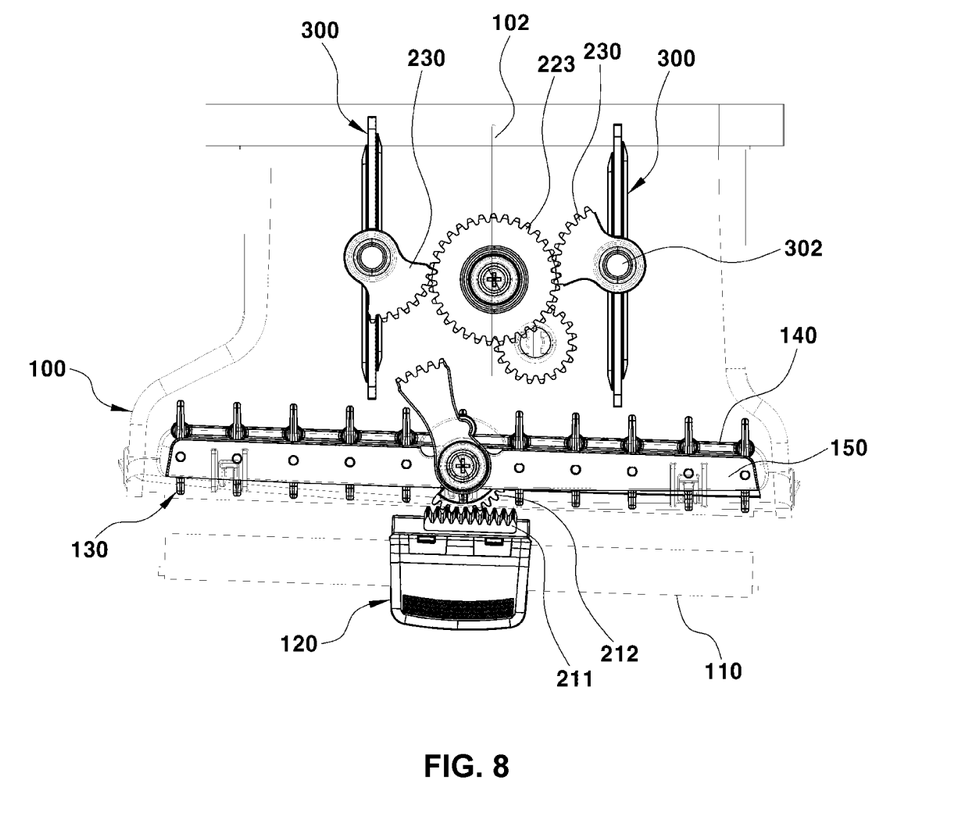
FIG. 8 is a bottom view illustrating the slim-type air vent device for a vehicle according to an exemplary embodiment of the present invention.
Figure 9:
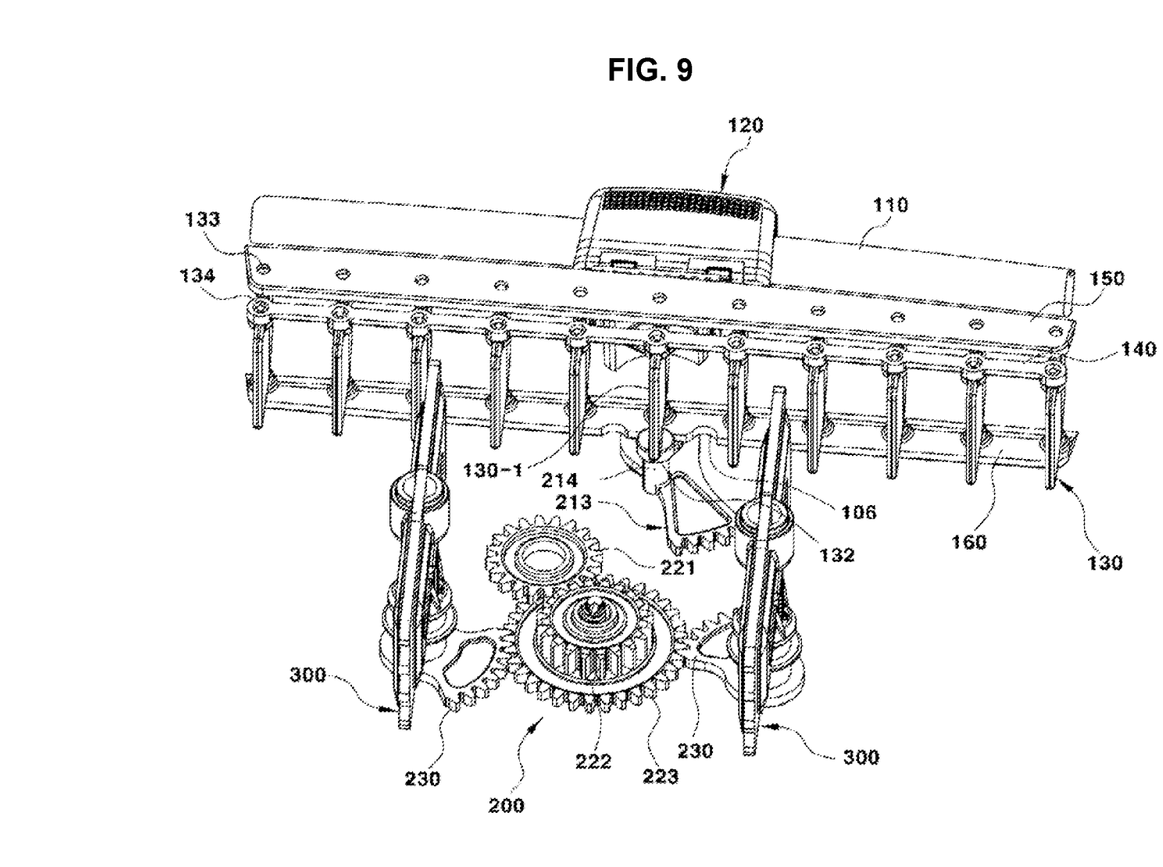
FIG. 9 and FIG. 10 are perspective views illustrating only an internal configuration of the slim-type air vent device for a vehicle according to an exemplary embodiment of the present invention.
Figure 10:
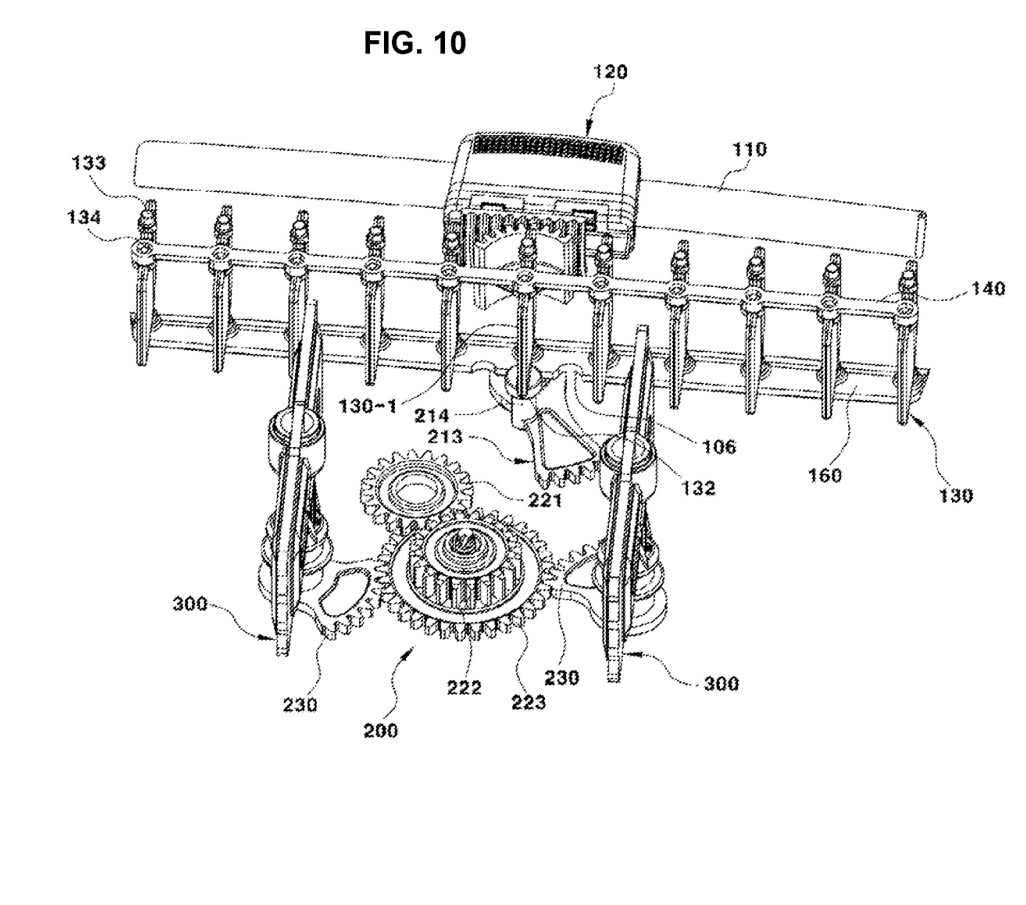

As well seen in FIG. 4, FIG. 9, and FIG. 10, the vertical wings 130, which are simultaneously rotated to the left or the right by a single link 140 during the left or right movement of the integrated control knob 120, are mounted immediately behind the single horizontal wing 110 in the internal compartment of the slim air duct 100.

In the present case, each of the vertical wings 130 has upper and lower hinge pins 133 and 131 formed on the upper and lower surfaces thereof. The upper hinge pins 133 are previously fastened to an upper support plate 150 by hinges, and the lower hinge pins 131 are previously fastened to a lower support plate 160 by hinges.

In addition, guide pins 134 are formed behind the upper hinge pins 133 of the respective vertical wings 130 to simultaneously rotate the vertical wings 130, and all of the guide pins 134 are fastened to the single link 140, which is horizontally disposed, by hinges.

After the structure in which the upper and lower support plates 150 and 160 and the single link 140 are coupled to the vertical wings 130 is inserted into the internal compartment of the slim air duct 100, the upper support plate 150 is fixedly assembled to the upper plate 103 of the slim air duct 100, and the lower support plate 160 is fixedly assembled to the lower plate 104 of the slim air duct 100. Consequently, the vertical wings 130 are disposed behind the single horizontal wing 110 in a state in which they are spaced apart therefrom, and only the single horizontal wing 110 is exposed to the outside in appearance.

Meanwhile, since the lower support plate 160 is mounted in a state in which it overlaps the lower plate 104 of the slim air duct 100, the locking pin 214 of the main gear 213 may not be inserted into the slot 106 of the lower plate 104 due to the lower support plate 160. Therefore, the lower support plate 160 has a slot, which passes therethrough and has the same shape as the slot 106 formed in the lower plate 104 of the slim air duct 100.

Hereinafter, the operation flow of the slim-type air vent device for a vehicle having the above configuration according to an exemplary embodiment of the present invention will be described.

FIG. 11A, FIG. 11B, FIG. 11C, and FIG. 11D are top cross-sectional views illustrating the operation flow of the slim-type air vent device for a vehicle according to an exemplary embodiment of the present invention.

Figure 11A:
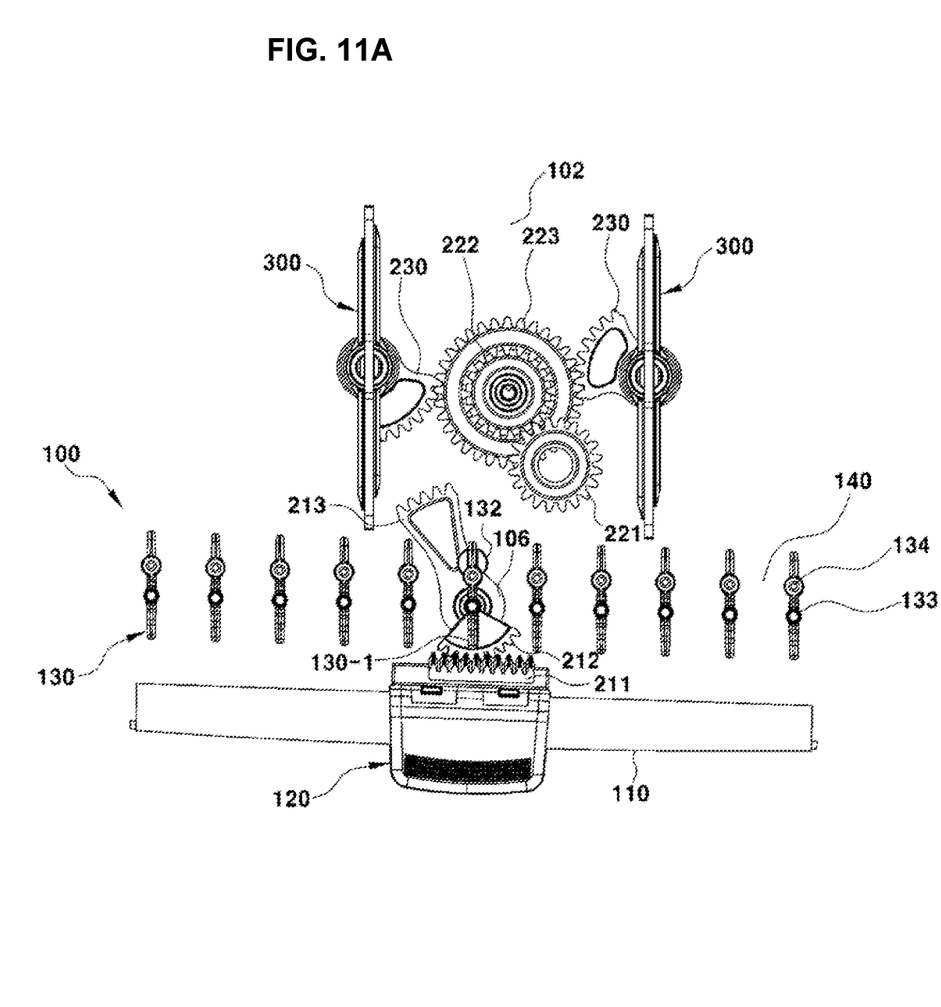
FIG. 11A, FIG. 11B, FIG. 11C, and FIG. 11D are top views illustrating the flow of opening or closing operation of the damper of the slim-type air vent device for a vehicle according to an exemplary embodiment of the present invention.

First, when the integrated control knob 120 mounted to the single horizontal wing 110 is not moved to the left or the right but is maintained at a neutral position, all vertical wings 130 are disposed in a row in forward and backward directions and the dampers 300 are simultaneously disposed in a row in forward and backward directions, being in a fully open state (see FIG. 11A).

In the present state, when the user moves the integrated control knob 120 to the left or the right by a predetermined distance, the front wing gear 212 is rotated while the wing knob rack gear 211 formed on the back surface of the integrated control knob 120 is moved to the left or the right, and the centermost vertical wing 130-1 is rotated together since the front wing gear 212 is formed on the centermost vertical wing 130-1.

As well seen in FIG. 9 and FIG. 10, all of the guide pins 134 formed on the respective vertical wings 130 including the centermost vertical wing 130-1 are fastened to the single link 140 by hinges. Therefore, when the centermost vertical wing 130-1 is rotated about its upper and lower hinge pins 133 and 131, the guide pin 134 of the centermost vertical wing 130-1 rectilinearly pushes the single link 140 in one direction.

Figure 11B:
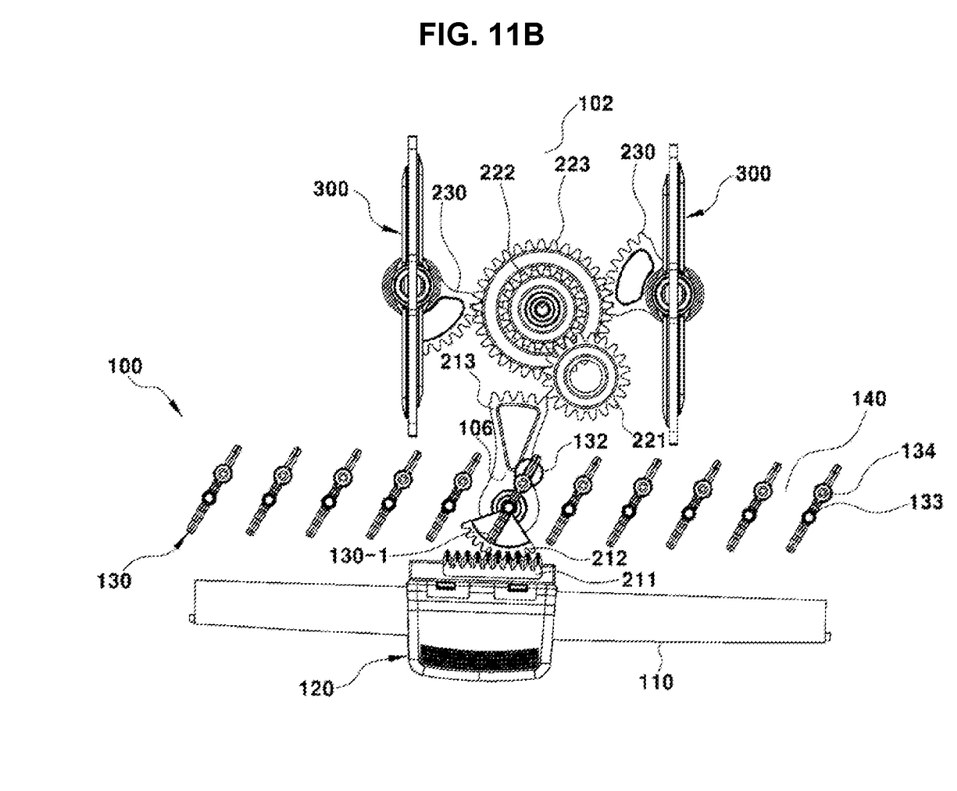

Thus, the remaining vertical wings 130 are rotated at the same angle together with the centermost vertical wing 130-1 by the rectilinear movement of the single link 140 (see FIG. 11B).

When the vertical wings 130 are equally rotated at a predetermined angle, air discharged through the outlet of the slim air duct 100, i.e. the flow of air, may be adjusted in a left or right direction.

Hereinafter, the process of adjusting the volume of air discharged through the outlet of the slim air duct will be described.

To adjust the volume of air, the integrated control knob 120 is moved in one direction by a greater distance than the movement distance of the integrated control knob 120 during adjustment of the wind directions of the vertical wings.

As a result, the front wing gear 212 is rotated in one direction while the wing knob rack gear 211 formed on the back surface of the integrated control knob 120 is moved in one direction, and at the same time the main gear 213 coaxially connected to the front wing gear 212 is rotated in a direction opposite to that of the front wing gear 212.

Next, the main gear 213 transmits rotation force to the first transmission gear 221 of the carrier gears 220, and the first transmission gear 221 transmits the rotation force to the second transmission gear 222.

In addition, the third transmission gear 223, which is integrally stacked on the second transmission gear 222 and has a great diameter, is rotated with the second transmission gear 222, and the third transmission gear 223 simultaneously rotates the output gears 230.

Figure 11C:
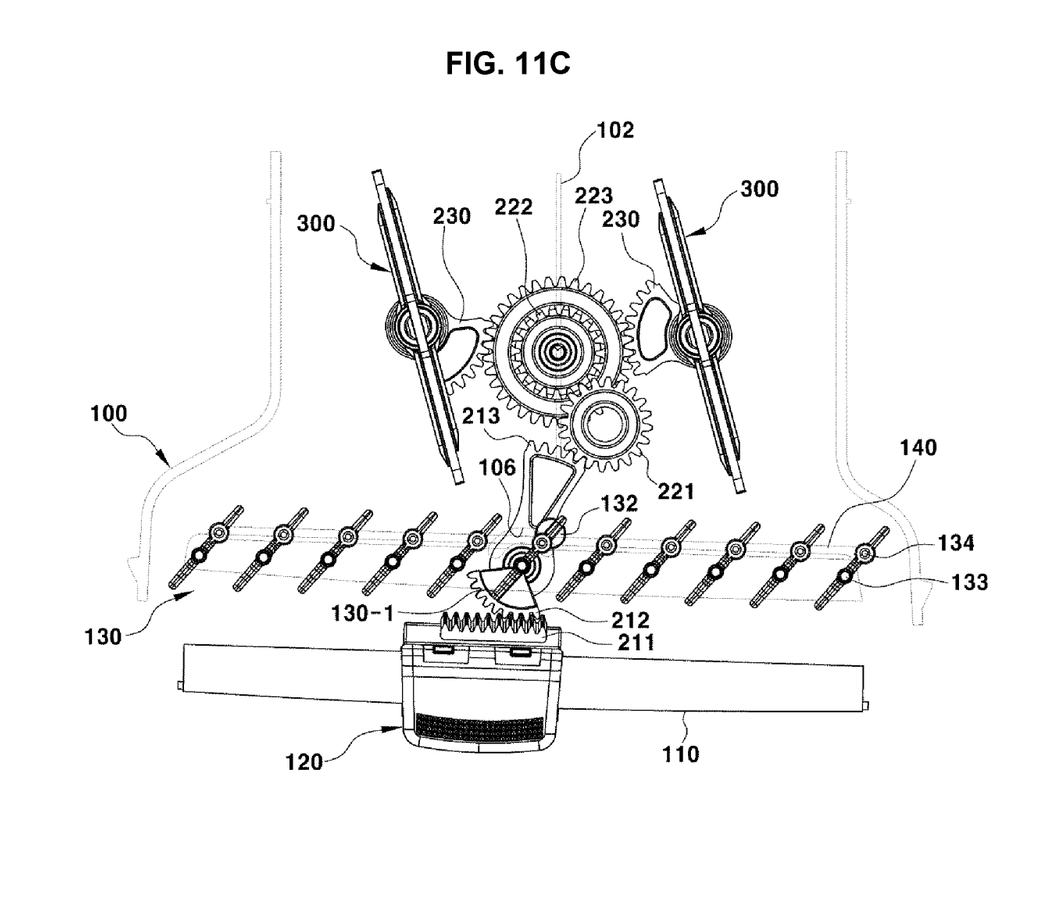

In the present case, since the output gears 230 are coaxially connected to the rotation shafts 302 of the dampers 300, the dampers 300 are rotated in a closed direction by the rotation force transmitted from the output gears 230, being in a partially closed state (see FIG. 11C).

Thus, the dampers 300 are partially closed, so that the volume of air discharged through the outlet of the slim air duct 100 is reduced by resistance of the dampers 300.

Here, when the integrated control knob 120 is maximally moved in one direction, the front wing gear 212 is maximally rotated in one direction while the wing knob rack gear 211 formed on the back surface of the integrated control knob 120 is maximally moved in one direction, and at the same time the main gear 213 coaxially connected to the front wing gear 212 is maximally rotated in a direction opposite to that of the front wing gear 212.

In the present case, the maximum angle of rotation of the main gear 213 is restricted to the distance by which the locking pin 214 is moved along the slot 106, and the maximum angle of rotation of the front wing gear 212 which transmits rotation force to the main gear 213 is also restricted due to the restriction of the maximum angle of rotation of the main gear 213. In addition, the movement distance of the integrated control knob 120 formed with the wing knob rack gear 211 for rotating the front wing gear 212 is restricted to the maximum movement distance.

Next, the main gear 213 transmits rotation force to the first transmission gear 221 of the carrier gears 220, and the first transmission gear 221 transmits the rotation force to the second transmission gear 222. In addition, the third transmission gear 223, which is integrally stacked on the second transmission gear 222 and has a great diameter, is rotated with the second transmission gear 222, and at the same time the third transmission gear 223 maximally rotates the output gears 230.

Figure 11D:
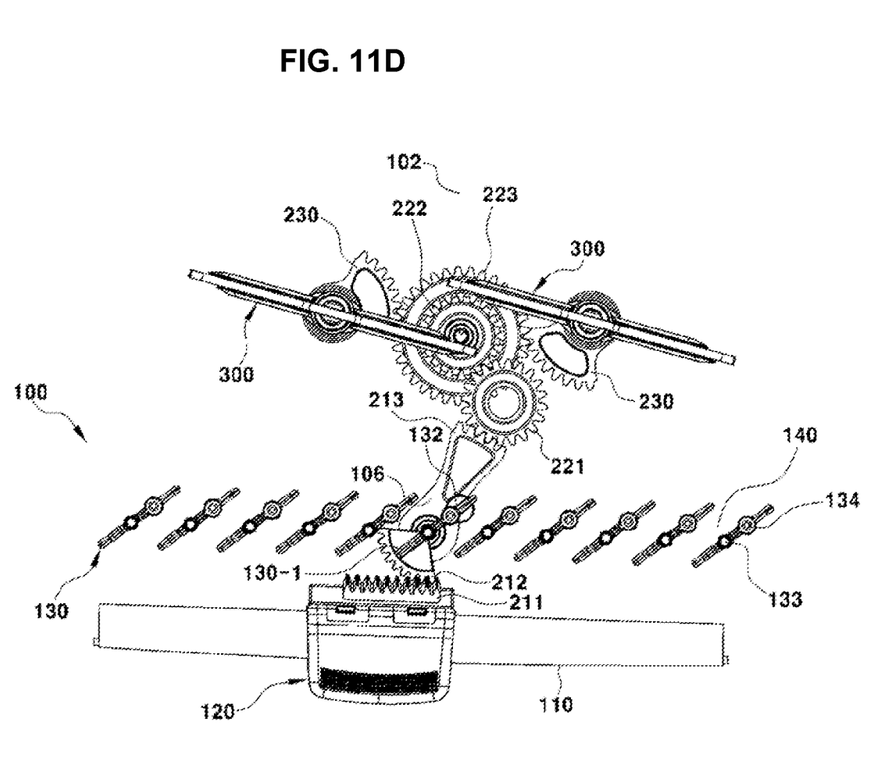

In the present case, since the output gears 230 are coaxially connected to the rotation shafts 302 of the dampers 300, the dampers 300 are maximally rotated in a closed direction by the rotation force immediately transmitted from the output gears 230, being in a fully closed state (see FIG. 11D).

Thus, the dampers 300 are fully closed, so that the flow of air discharged inside a vehicle through the outlet of the slim air duct 100 is blocked.

As described above, the integrated control knob 120 is mounted to the single horizontal wing 110 applied to the slim-type air vent device, with the consequence that the wind directions of the vertical wings can be smoothly adjusted in the left or right direction by the movement of the integrated control knob 120 in the left or right direction, and the opening angle of each damper 300 can be easily adjusted by the maximum movement of the integrated control knob 120 in one direction.

As is apparent from the above description, the present invention has the following effects.

Firstly, an integrated control knob is mounted to a single horizontal wing applied to the slim-type air vent device, with the consequence that the wind directions of vertical wings can be smoothly adjusted in the left and right directions and the opening angle of a damper can be easily adjusted, depending on the movement distance of the integrated control knob.

Secondly, since the integrated control knob is functionally integrated with an existing damper control knob so that the existing damper control knob is excluded from a center fascia panel or a crash pad, it is possible to secure a wider space for installation of a cluster and an AVN system and to improve a degree of freedom in the design of the cluster and the AVN system.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures. The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternations and modifications thereof. It is intended that the scope of the invention be defined by the Claims appended hereto and their equivalents.

What is claimed is:

1. An air vent device for a vehicle, the air vent device comprising:
    a single horizontal wing mounted at an outlet position of an air duct to be vertically rotatable;
    an integrated control knob mounted to the single horizontal wing to be horizontally movable;
    dampers mounted in a rear space in the air duct, wherein an opening angle of each of the dampers is adjustable;
    a gear assembly disposed between a back surface of the integrated control knob and rotation shafts of the dampers, for transmission of power, the gear assembly having a plurality of gears; and
    a plurality of vertical wings mounted behind the single horizontal wing in an internal space of the air duct, to be rotated in a left or right direction by a single link during a left or right movement of the integrated control knob,
    wherein the gear assembly comprises:
        a plurality of input gears mounted to the integrated control knob and one of the plurality of vertical wings;
        a plurality of output gears mounted to the rotation shafts of the dampers; and
        a plurality of carrier gears disposed between the plurality of input gears and the plurality of output gears to transmit rotation force from the plurality of input gears to the plurality of output gears.

2. The air vent device of claim 1, wherein the integrated control knob has a slide hole which horizontally passes therethrough for insertion of the single horizontal wing.

3. The air vent device of claim 1, wherein the plurality of input gears comprise:
    a wing knob rack gear mounted to a back surface of the integrated control knob;
    a front wing gear formed on a front end portion of a centermost vertical wing of the plurality of vertical wings to engage with the wing knob rack gear, and
    a main gear disposed at a bottom of a lower plate of the air duct and coaxially fastened to a lower hinge pin of the centermost vertical wing.

4. The air vent device of claim 3, wherein the main gear has a locking pin formed at a first side thereof, the locking pin passing through the lower plate of the air duct, and the centermost vertical wing has a locking groove formed in a bottom rear end portion thereof, the locking pin being inserted and fastened into the locking groove.

5. The air vent device of claim 4, wherein the lower plate of the air duct is formed with a slot configured for restricting an angle of left-right rotation of the main gear, and the locking pin is configured to be inserted through the slot to be horizontally movable.

6. The air vent device of claim 1, wherein the plurality of carrier gears comprise:
    a first transmission gear rotatably mounted to a bottom of the slim air duct to be engageable with a main gear of the plurality of input gears;

a second transmission gear engaged with the first transmission gear, and a third transmission gear having a greater diameter than the second transmission gear, wherein the second transmission gear and the third transmission gear are vertically stacked to be integrated to each other and are rotatably mounted to a bottom of the air duct.

7. The air vent device of claim 6, wherein the plurality of output gears engage with the third transmission gear of the plurality of carrier gears while being coaxially connected to the rotation shafts of the dampers mounted in the rear space in the air duct.

8. The air vent device of claim 1, wherein the air duct has a partition wall formed in the rear space thereof to divide the rear space into a left space and a right space, and the dampers are openably or closably mounted in the respective rear spaces divided by the partition wall.

9. The air vent device of claim 1, wherein upper and lower support plates for rotatably supporting the plurality of vertical wings are mounted to upper and lower plates in the internal space of the air duct, and each of the plurality of vertical wings has upper and lower hinge pins formed on upper and lower surfaces thereof, the upper and lower hinge pins being respectively fastened to the upper and lower support plates by hinges.

10. The air vent device of claim 9, wherein the lower support plate has a slot passing therethrough, the slot having the same shape as an opening formed in the lower plate of the air duct.

11. The air vent device of claim 9, wherein guide pins are formed behind the upper hinge pins of each of the plurality of vertical wings to simultaneously rotate the plurality of vertical wings, and all of the guide pins are connected to the single link, which is horizontally disposed, by hinges.

* * * * *